(No Model.)

W. F. JENKINS.
TROLLEY FOR ELECTRIC RAILWAYS.

No. 395,703. Patented Jan. 8, 1889.

Witnesses.
N. B. Harris.
C. R. Ferguson

Inventor.
W. F. Jenkins
By his Attorney
E. W. Anderson

UNITED STATES PATENT OFFICE.

WILTON F. JENKINS, OF RICHMOND, VIRGINIA.

TROLLEY FOR ELECTRIC RAILWAYS.

SPECIFICATION forming part of Letters Patent No. 395,703, dated January 8, 1889.

Application filed April 18, 1888. Serial No. 271,019. (No model.)

*To all whom it may concern:*

Be it known that I, WILTON F. JENKINS, a citizen of the United States, and a resident of Richmond, in the county of Henrico and State of Virginia, have invented certain new and useful Improvements in Trolleys for Electric Railways; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
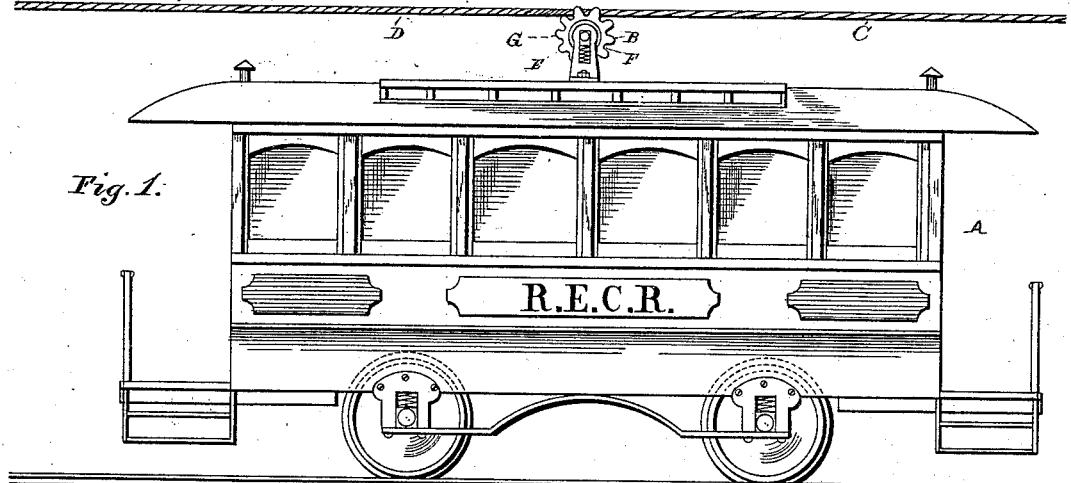
Figure 2:
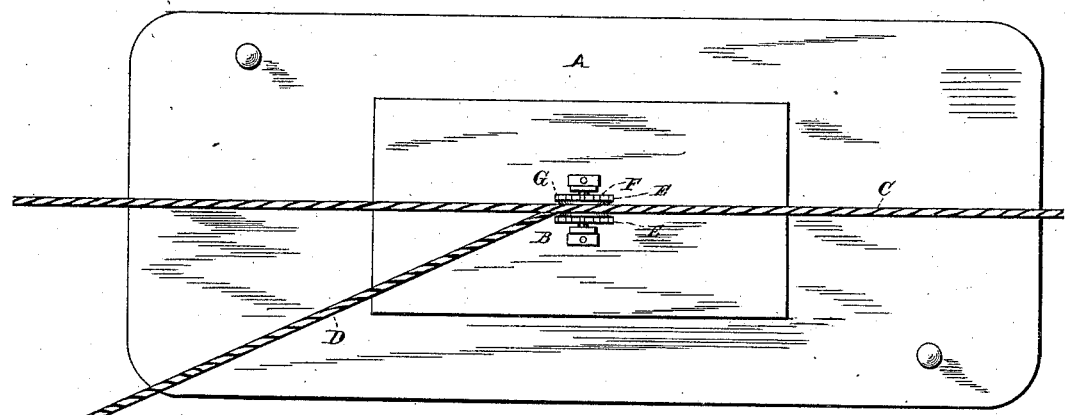
Figures 3, 4:
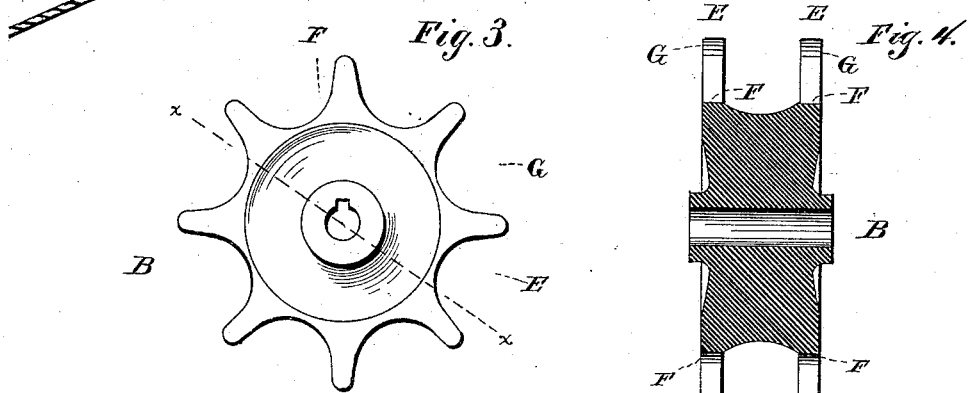

Figure 1 of the drawings is a representation of side elevation of a car with my improvement attached. Fig. 2 is a top view of same. Fig. 3 is a detail side view of my improved trolley. Fig. 4 is a section on the line *x x*, Fig. 3.

The invention relates to improvements in trolleys of that class used more particularly in connection with electrical cables placed above the tramway-cars.

In the trolleys now used the outer flanges are of an unbroken diameter, and consequently when the trolley-flange comes in connection with the switch or cross-cable the main cable is raised above the flanges and is thrown to one side, or out of connection with the trolley; and the object of my invention is to obviate this difficulty by providing a trolley having a recessed or scalloped circumference to its flanges, whereby the main cable is not lifted from its connection as the trolley passes the branch.

Referring to the drawings, A designates the upper portion of a car; B, the trolley standing above said car; C, the main electrical cable, and D the branch cable.

The body of the trolley B may be of any well-known form and pivoted upon an axial bearing, in the usual manner. The flanges E of the trolley B are circumferentially depressed or escalloped, as at F, which provides the projections G.

In operation it will be observed that the trolley connects with the main cable on its lower side; that when a branch cable is reached one of the projections G passes under said branch, so that it is received in a notch, F, and the trolley is allowed to proceed on the main-line cable. The depressions or notches F are preferably semicircular and of a diameter a little greater than the cross-cable, and the inner side of the depressions is in a line flush with the track of the trolley.

Having described my invention, what I claim is—

In combination with the main cable and cross-cables, the trolley having the flanges circumferentially scalloped, providing the projections G, and having said semicircular scallops of a diameter greater than the cable.

In testimony whereof I affix my signature in presence of two witnesses.

WILTON F. JENKINS.

Witnesses:
C. R. FERGUSON,
VILLETTE ANDERSON.